United States Patent [19]

Frisen

[11] 4,132,246
[45] Jan. 2, 1979

[54] BACKFLOW PREVENTION DEVICES

[75] Inventor: Robert A. Frisen, Rolling Meadows, Ill.

[73] Assignee: International Telephone and Telegraph Corporation, New York, N.Y.

[21] Appl. No.: 710,284

[22] Filed: Jul. 30, 1976

[51] Int. Cl.$^2$ .............................................. F16K 15/06
[52] U.S. Cl. ..................................... 137/536; 137/542
[58] Field of Search ........... 137/536, 542, 543, 543.15, 137/543.17, 543.13

[56] References Cited

U.S. PATENT DOCUMENTS

| 569,884 | 10/1896 | Parker | 137/543.15 |
|---|---|---|---|
| 1,519,856 | 12/1924 | Lorraine | 137/536 X |
| 1,651,778 | 12/1927 | Rice | 137/543.13 X |
| 1,676,666 | 7/1928 | Pivoto | 137/542 X |
| 1,767,538 | 6/1930 | Mahan | 137/542 X |
| 2,619,115 | 11/1952 | Dondero | 137/543 X |
| 3,688,794 | 9/1972 | Bird | 137/542 X |

FOREIGN PATENT DOCUMENTS

| 775287 | 10/1934 | France | 137/542 |
|---|---|---|---|
| 80940 | 10/1952 | Norway | 137/543.13 |

*Primary Examiner*—Robert G. Nilson
*Attorney, Agent, or Firm*—James B. Raden; Donald J. Lenkszus

[57] ABSTRACT

A backflow prevention device is disclosed which includes a spring operated check valve and a shielding member for protection of the spring from transverse fluid flow disturbances. The shielding member is preferably cylindrical in shape and surrounds the spring longitudinally about 40% to 90% of the extended spring length.

11 Claims, 6 Drawing Figures

BACKFLOW PREVENTION DEVICES

BACKGROUND OF THE INVENTION

This invention relates to backflow prevention devices and, particularly, to improved check valves of the spring loaded poppet type for use in a backflow preventer.

Backflow preventers utilizing check valves of the spring loaded poppet type for preventing contamination of water supplies as a result of back flow or pressure reversal in water supply lines have been known in the art. However, recent developments in this field have necessitated redesign efforts in regard to the construction of the check valve portion of the devices to improve the operational characteristics thereof. Specifically, industry and governmental standards for backflow prevention devices have been modified so that these devices must now achieve lower pressure loss at rated flow and/or higher sealing pressures at no flow than prior devices in order to meet the standards.

It has been found that these objectives can be accomplished in backflow prevention devices utilizing spring loaded poppet type check valves by internal streamlining of the valve body and, more importantly, by employing specially designed springs. These special springs optimally have buckling ratios as determined by dividing the free length of the spring by its pitch diameter (L/D) approaching 4.00 and use of such springs enables the designer to select an optimal spring pitch diameter as well as the lowest rate spring (i.e., ratio of spring force to spring deflection) suitable for such a pitch diameter. The "pitch diameter" used herein is also referred to elsewhere as the mean diameter of the spring helix or simply the mean diameter and may be determined by measuring the outside diameter of the spring perpendicular to the center line axis of the spring and subtracting the wire diameter from the measurement. The selected low rate spring is important to provide increased closing forces within the valve body without adversely affecting pressure loss at rated flow. However, in operation, fluid flow within the valve housing has been found to induce serious vibrational movement of these springs having buckling ratios of about 4.00 which causes amplification of flow disturbances within the housing. The flow disturbances in turn cause excessive pressure drops at rated flow. In addition to the undesirable pressure drops at rated flow, it has also been found that objectionable clattering noises are encountered in the valves as a result of spring surging of the higher buckling ratio springs. This disadvantageous noise factor occurring from collision of adjacent turns of the higher buckling ratio springs as fluid in the valve housing flows across the springs is present throughout a wide range of fluid flow rates.

These and other disadvantages relating to the amplified disturbances resulting from flow excited spring vibrations and the clattering noise from spring surging are overcome by the present invention wherein there is provided a shield to guide fluid flow around the outside of the spring rather than allowing flow through the spring windings.

SUMMARY OF THE INVENTION

Briefly, backflow prevention devices utilizing a spring loaded poppet type check valve are provided. These devices enable lower pressure loss at rated flow and higher sealing pressures at no flow than prior backflow preventers but do not encounter the flow disturbances or clattering noise problems encountered heretofore in such devices. The device includes a valve housing, a spring operated poppet type valve assembly within the housing and a shield, preferably cylindrical in shape, which surrounds the spring and protects the spring from transverse fluid flow. The length of the shield is about 40% to 90% of the extended spring length with the valve in the open position, preferably about 55% to 75% thereof and may be solid throughout its length to insulate the spring from flow disturbances or it may have perforations in its surface which will diminish flow disturbances of the spring without totally insulating the spring from such flow. If the shield is longer than about 90% of the extended spring length with the valve open then it has been found that pressure loss within the valve body is disadvantageously increased due to the blocking of transverse flow therethrough. Furthermore, if the length of the shield is less than about 40% of the extended spring length with the valve open, then the resulting exposure of the spring to the fluid flow causes amplified flow disturbances, increased pressure drop, undesirable clattering noises as the spring turns collide and, also, excessive wear on the springs from such collisions.

DETAILED DESCRIPTION

Figure 1:
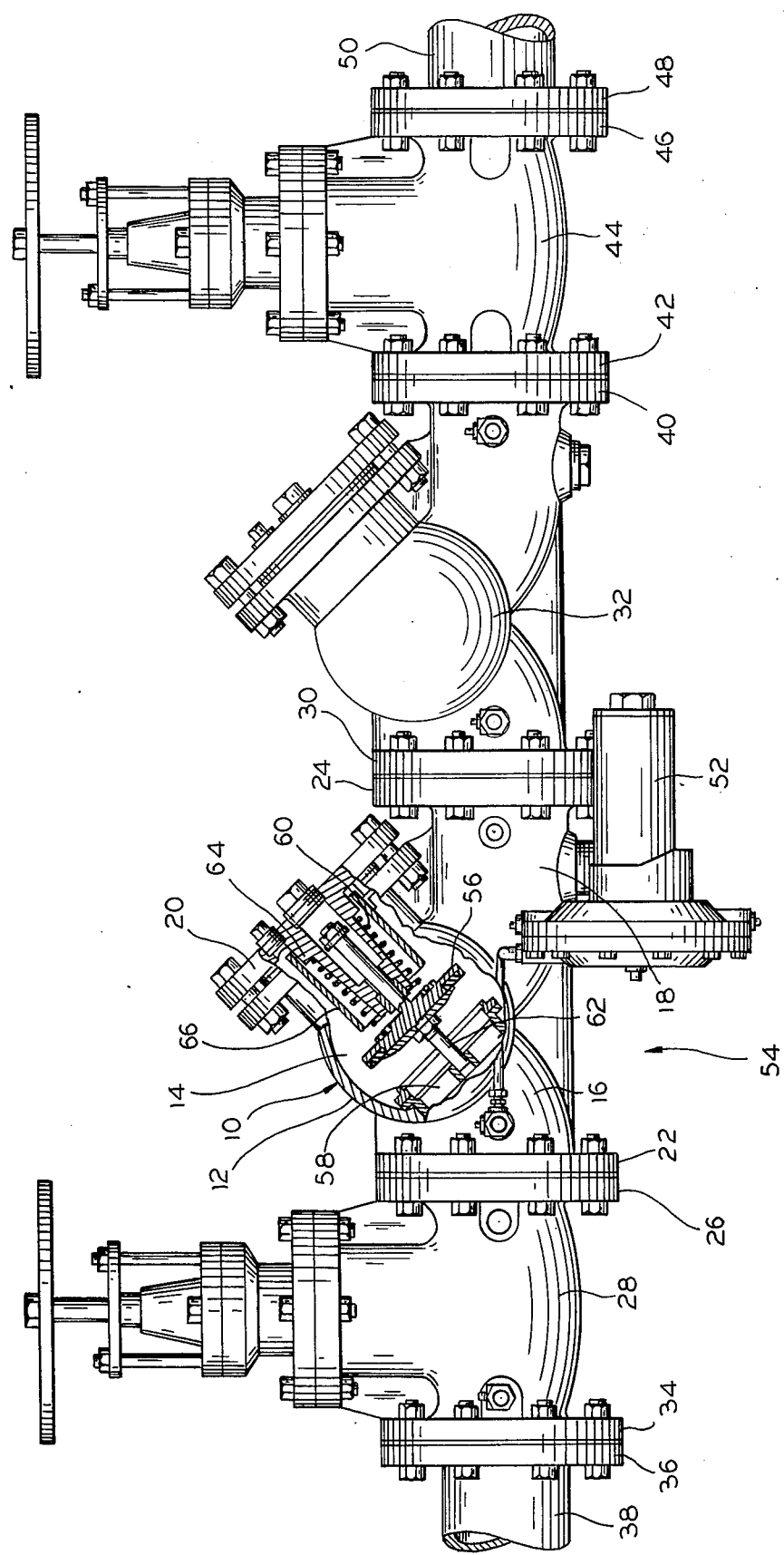
FIG. 1 is a side elevational view of the backflow preventer of the present invention installed in a piping system with a portion broken away to show the internal construction of a check valve in its open position.
Figure 2:
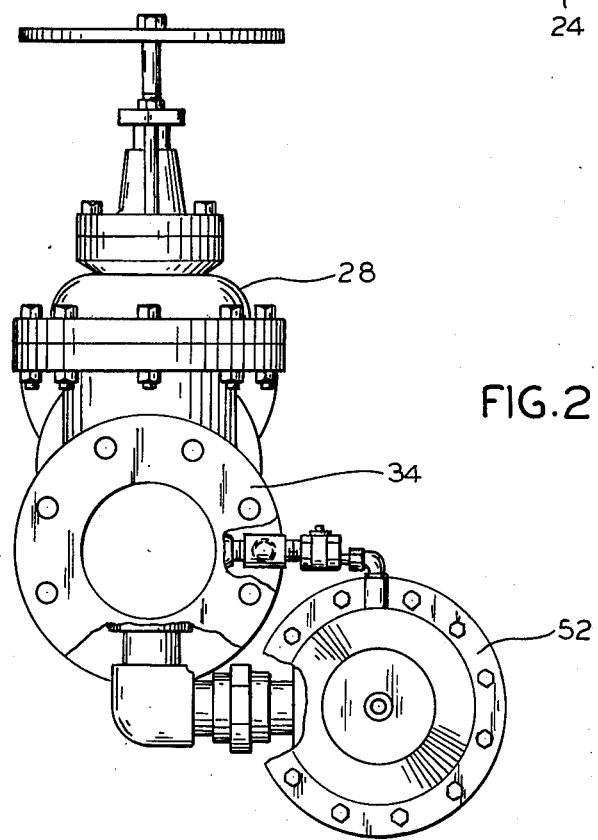
FIG. 2 is an end elevational view of the backflow preventer of FIG. 1.

Referring first to FIGS. 1 and 2, there is shown generally at 10 a broken away view of a suitable check valve arranged in accordance with the present invention. Check valve 10 includes a housing 12 which may comprise a metallic or any other suitable material. Check valve 10 further includes a hollowed body portion 14 which provides an inlet passageway 16 and an outlet passageway 18. A cover plate 20 which is bolted to the housing 12 provides a closure for the valve 10 and, also, serves to permit access to the interior of the housing 12. The ends of the housing 12 are provided with annular attachment flanges 22 and 24. Flange 22 is adapted for bolt connection to a similar flange 26 on adjacent upstream shut-off valve 28. Flange 24 is adapted for bolt connection to a similar flange 30 of adjacent downstream valve 32. Another annular attachment flange 34 is provided on the upstream end of shut-off valve 28 which is adapted for bolt connection to a similar flange 36 on inlet pipe 38. A further annular attachment flange 40 on the downstream end of check valve 32 is adapted for bolt connection to annular attachment flange 42 provided on the upstream end of a second shut-off valve 44. The shut-off valve 44 in turn has an annular attachment flange 46 at its downstream end which is adapted for bolt connection to a similar flange 48 on outlet pipe 50. The shut-off valves 28 and 44, the check valves 10 and 32 and a differential relief valve 52 interconnected in passageways 16 and 18 of check valve 10 comprising a reduced pressure backflow preventer shown generally as 54 of the present invention.

In normal operation with normal flow conditions, a fluid such as water enters through inlet pipe 38 passes through shut-off valve 28 and then, assuming that check valve 10 is open as a result of valve poppet or disc 56 moving out of its closure position with valve seat 58 due to the pressure of fluid flowing against the resistance of disc 56 caused by valve spring 60. The valve spring 60 is positioned about valve stem 62 between valve disc 56 and step 64 of cover plate 20. The fluid passes into the hollowed body portion 14 of check valve 10 through inlet passageway 16. The fluid then passes out of valve 10 through the outlet passageway 18 into check valve 32. Check valve 32 is similar to check valve 10 in regard to its poppet type spring operation and, thus, the pressure of the flowing fluid will open this valve and allow passage of the fluid through valve 32 into shut-off valve 44 and thereafter into outlet pipe 50. Under these normal operating conditions, the differential relief valve 52 remains closed and the pressure level in outlet passageway 18 of check valve 10 is maintained at a level of at least about 5.0 psi lower than the inlet pressure in passageway 16.

In the event of a backflow from pipe 50 through a fouled check valve 32, relief valve 52 opens to enable fluid discharge from the device 54 to atmosphere in a manner such that the pressure in passageway 18 will be maintained at a level at least about 0.5 psi lower than the inlet pressure in passageway 16. As a result of this activation of relief valve 52, the reverse flow of contaminants from an upstream location in pipe 50 back through fouled check valve 32 into the fluid supply in pipe 38 is prevented.

Figure 3:
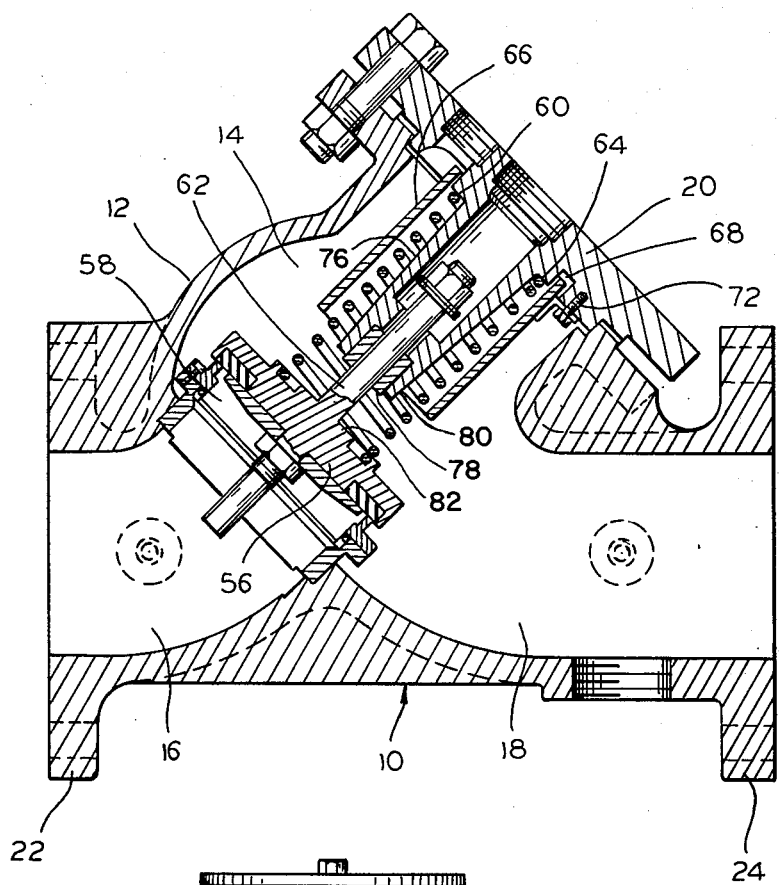
FIG. 3 is an enlarged fragmentary view of the check valve of FIG. 1 shown in its closed position.
Figure 4:
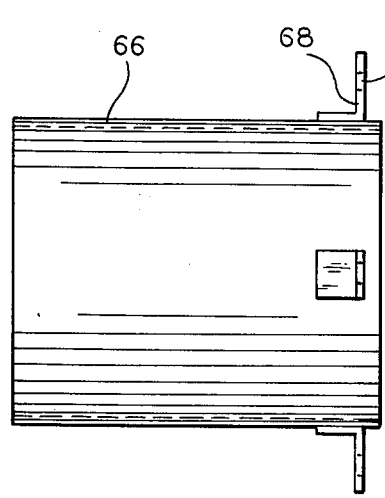
FIG. 4 is a side view of a spring shield member as shown in FIG. 1.
Figure 5:
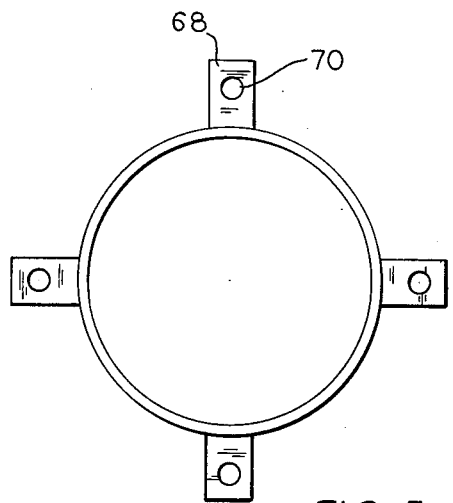
FIG. 5 is an end view of the spring shield member of FIG. 4.

As an improvement in the construction of the check valve 10, a cylindrical shield member 66, best illustrated in FIGS. 3-5, is positioned about the valve spring 60 in a manner such that fluid flow is guided around the outside of the shield 66 rather than allowing flow through the spring windings. This shield 66 has been found to eliminate several flow disturbance problems encountered heretofore in check valves of the spring operated poppet type. As a result of the inclusion of the shield member 66 pressure loss at rated flow has been significantly reduced and, also, objectionable clatter of the spring resulting from collision of adjacent turns of the spring as fluid flows through the spring windings has been eliminated. Additionally, as a result of the elimination of the spring turn collisions, wear of adjacent spring turns has been essentially eliminated. These attributes of the use of shield member 66 in the construction of check valve 10 provide the basis for enabling installation of a spring having a buckling ratio of about 4.00 in the check valve. This factor is extremely advantageous in that use of such springs having higher buckling ratios and the concommitant characteristics of lower rate and optimum pitch diameter are essential to accomplish the crucial objectives of valve designers to provide backflow prevention devices having lower pressure loss at rated flow and higher sealing pressures at no flow.

In accordance with the improvement, a means is provided to limit the travel of the valve disc 56 when the valve is in the fully opened condition. Specifically, the cover plate 20 includes a hollow valve guide 76 adapted to guide the movement of valve stem 62. A seal 78 is provided at the end of the valve guide 76. The end portion 80 of valve guide 76 extends beyond the shield 66 and is adapted to engage a surface 82 of the valve disc 56 such that when the valve is in the fully open condition, the shield 66 extends less than about 90% of the length of the valve spring 60.

The shield member 66 as illustrated in the preferred embodiment of the invention is cylindrical in shape and formed of a solid corrosion resistant metallic material. However, the shield 66 may suitably be formed in other shapes such as conical and any other suitable shapes so long as the shape selected does not adversely interfere with the flow of fluid and give rise to disadvantageous flow disturbances. The shield may also be formed of any other suitable materials such as plastics and the like and the shield may have holes or perforations 76 formed in the walls thereof as illustrated in FIG. 6 which will enhance fluid flow while maintaining protection of the spring from serious flow disturbances.

Installation of the shield member 66 in valve 10 may be accomplished by various techniques. For example, as depicted in FIGS. 3-5, elbow members 68 are affixed to the shield 66 by any suitable means such as welding, adhesive and like techniques and these elbows 68 are provided with bolt appertures 70 through which bolts 72 are applied to enable bolt connection of elbow 68 to the cover plate 20 of valve 10.

Figure 6:
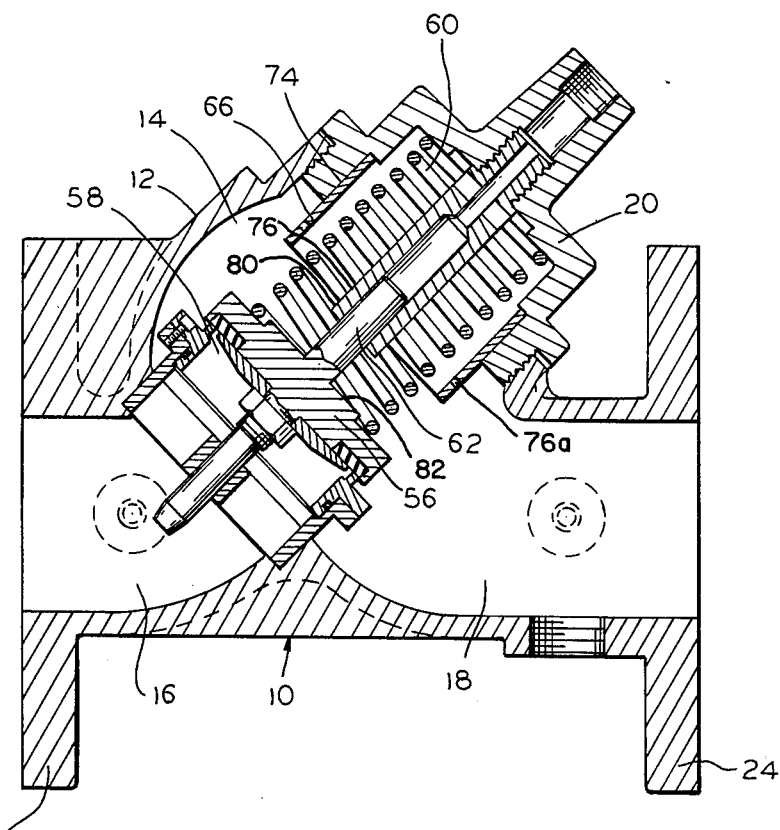
FIG. 6 is a cross-sectional view showing an alternative embodiment of the check valve of the present invention.

In an alternative embodiment of the invention shown in FIG. 6, an offset 74 is formed in cover 20 providing a nesting position for shield 66. The shield 66 having perforations 76a in the surface thereof is affixed to the cover 20 by any suitable means such as welding, press fit, adhesive and the like. The means provided to limit the travel of the valve disc 56 when the valve is in the fully opened condition is provided by end portion 80 of the valve guide 76. The valve guide 76 in this embodiment is a separate hollow cylindrical unit which at one end is adapted to be fastened to the cover plate 20 and at the other end is adapted to receive valve stem 62. In a further embodiment, not shown, the shield member 66 may be formed as an integral part of the housing or cover plate.

What has been taught, then, is a backflow prevention device utilizing a spring loaded check valve wherein a check valve spring shield is provided which enables effective and commercially acceptable design of the device to meet prevailing standards. The forms of the invention illustrated and described herein are but preferred embodiments of these teachings. They are shown as illustrations of the inventive concepts, however, rather than by way of limitation, and it is pointed out that various modifications and alterations may be indulged in within the scope of the appended claims.

What is claimed is:

1. In a backflow prevention device including at least one spring operated check valve communicatingly interconnected with an inlet pipe and an outlet pipe, said check valve controlling fluid flow from said inlet pipe to said outlet pipe and preventing backflow from said outlet pipe into said inlet pipe, the improvement comprising means affixed about the circumference of said spring for shielding said spring in said check valve from transverse flow disturbances caused by said fluid flow to reduce pressure loss in said valve at rated flow and to eliminate clatter of said spring resulting from collision of adjacent turns of said spring caused by fluid flow through the spring windings, said shielding means having a length greater than about 40% of the extended length of said spring when said valve is in its closed condition, and means for limiting the movement of said check valve such that said shielding means extends over less than about 90% of the extended length of said spring when said valve is in its fully opened condition.

2. The backflow prevention device of claim 1 wherein said shielding means is a cylinder which surrounds the spring and protects said spring from transverse fluid flow.

3. The backflow prevention device of claim 1 wherein perforations are formed in the shielding means to enhance fluid flow without causing flow disturbances.

4. The backflow prevention device of claim 1, wherein said spring has a buckling ratio of about 4.00.

5. The backflow prevention device of claim 4, further comprising a valve guide for said check valve and wherein said limiting means comprises a portion of said valve guide.

6. The backflow prevention device of claim 1, further comprising a valve guide for said check valve and wherein said limiting means comprises a portion of said valve guide.

7. A check valve for a backflow prevention device comprising: a valve housing; a spring operated poppet type valve assembly within said housing; a means for shielding said spring from transverse flow disturbances caused by the flow of fluid through said valve, said shielding means having a length of at least about 40% of the extended length of said spring when said valve is in its closed condition, said shielding means guiding said fluid flow about said spring whereby pressure loss in said valve at rated flow is reduced and clatter of said spring caused by fluid flow is eliminated; and a means for limiting the movement of said poppet type valve such that said shielding means extends over less than about 90% of the extended length of said spring when said valve is in its fully opened condition.

8. The check valve of claim 7 wherein said shielding means is a cylinder.

9. The check valve of claim 7, wherein said spring has a buckling ratio of about 4.00.

10. The check valve of claim 9, wherein said valve assembly includes a valve guide and said limiting means comprises a portion of said valve guide extending beyond said shielding means.

11. The check valve of claim 7, wherein said valve assembly includes a valve guide and said limiting means comprises a portion of said valve guide extending beyond said shielding means.

* * * * *